(12) United States Patent
Wilson et al.

(10) Patent No.: US 10,324,723 B2
(45) Date of Patent: Jun. 18, 2019

(54) SYSTEMS AND METHODS FOR PROCESSING BOTH INSTRUCTIONS AND CONSTANT VALUES FROM A MEMORY OF A DIGITAL PROCESSOR ACCESSED BY SEPARATE POINTERS

(71) Applicant: Freescale Semiconductor Inc., Austin, TX (US)

(72) Inventors: Peter J Wilson, Leander, TX (US); Brian C Kahne, Austin, TX (US); Jeffrey W Scott, Austin, TX (US)

(73) Assignee: NXP USA, Inc., Austin, TX (US)

( * ) Notice: Subject to any disclaimer, the term of this patent is extended or adjusted under 35 U.S.C. 154(b) by 623 days.

(21) Appl. No.: 14/321,957

(22) Filed: Jul. 2, 2014

(65) Prior Publication Data

US 2016/0004536 A1 Jan. 7, 2016

(51) Int. Cl.
*G06F 9/30* (2018.01)
*G06F 9/35* (2018.01)
*G06F 9/38* (2018.01)

(52) U.S. Cl.
CPC ............ *G06F 9/30167* (2013.01); *G06F 9/35* (2013.01); *G06F 9/3814* (2013.01); *G06F 9/3832* (2013.01)

(58) Field of Classification Search
CPC .................... G06F 9/30047; G06F 9/30167
See application file for complete search history.

(56) References Cited

U.S. PATENT DOCUMENTS

| | | | | |
|---|---|---|---|---|
| 5,072,372 A | | 12/1991 | Schmidt | |
| 6,314,504 B1* | | 11/2001 | Dent | G06F 9/30043 |
| | | | | 711/212 |
| 7,877,565 B1* | | 1/2011 | Allen | G06F 9/3851 |
| | | | | 345/537 |
| 2004/0015678 A1* | | 1/2004 | Strom | G06F 9/30101 |
| | | | | 712/202 |
| 2007/0273698 A1* | | 11/2007 | Du | G06F 9/30167 |
| | | | | 345/501 |
| 2008/0282034 A1* | | 11/2008 | Jiao | G06F 9/30025 |
| | | | | 711/125 |
| 2009/0006814 A1* | | 1/2009 | Lie | G06F 9/30149 |
| | | | | 712/208 |
| 2009/0240931 A1* | | 9/2009 | Coon | G06F 9/30054 |
| | | | | 712/234 |
| 2014/0281391 A1* | | 9/2014 | Dieffenderfer | G06F 9/30145 |
| | | | | 712/208 |
| 2014/0372703 A1* | | 12/2014 | Ricketts | G06F 12/0897 |
| | | | | 711/133 |

* cited by examiner

*Primary Examiner* — Jacob Petranek (57) ABSTRACT

Disclosed is a digital processor comprising an instruction memory having a first input, a second input, a first output, and a second output. A program counter register is in communication with the first input of the instruction memory. The program counter register is configured to store an address of an instruction to be fetched. A data pointer register is in communication with the second input of the instruction memory. The data pointer register is configured to store an address of a data value in the instruction memory. An instruction buffer is in communication with the first output of the instruction memory. The instruction buffer is arranged to receive an instruction according to a value at the program counter register. A data buffer is in communication with the second output of the instruction memory. The data buffer is arranged to receive a data value according to a value at the data pointer register.

20 Claims, 4 Drawing Sheets

SYSTEMS AND METHODS FOR PROCESSING BOTH INSTRUCTIONS AND CONSTANT VALUES FROM A MEMORY OF A DIGITAL PROCESSOR ACCESSED BY SEPARATE POINTERS

FIELD

The present disclosure relates generally to computer processors, and more specifically, to systems and methods for processing computer instructions.

BACKGROUND

A modern processor is typically designed to perform tasks by executing a sequence of instructions, which are stored in memory and fetched in turn by the processor. In many computer architectures, instructions have a fixed length, and a predetermined arrangement of fields, such as operation code (opcode), source and destination addresses, and so on.

Programs often require constant values that are too large for an allocated field of a single instruction.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Situations may arise where some computer programs make use of constants that are larger than the size of an instruction. One such example is a processor which can address 2^32 bytes of memory, and therefore requires the ability to branch to any location in that memory, but has instructions encoded in 32 bits. The branch instruction needs to be able to hold a value, whether displacement or actual address, which can be 32 bits in size. However, there are an insufficient number of available bits in a 32 bit instruction to hold a 32 bit value.

One conventional approach for addressing this need is to fragment the large value into smaller segments that can each fit in an instruction, and to load the value into a register by a sequence of successive operations. However, this approach requires more space to hold the instructions than is strictly needed, since each instruction is larger than the data fragment it contains. Also, this approach requires more execution time and power, since more instructions are executed due to the fragmentation.

Another conventional approach is to hold the large value in memory, then load it into a register according to a load instruction. However, this approach results in a performance degradation. In a system comprising caches, a value that is needed may not be in the cache when required, resulting in a latency problem, which slows execution.

Another conventional approach is to intersperse values between portions of the program in memory, and to apply a special load instruction that uses the current value of the program counter as a base to read the values into a register. This approach maintains the values in a data cache or the instruction cache. When placing the values in the data cache, latency problems may arise similar to those described above. When placing the values in the instruction cache, it is likely that the normal fetching of instructions into that cache will pre-fetch the values, reducing the latency problem. However, the region of memory holding the program will, in most architectures, require access permissions which allow both 'execute' permission and 'read' permission, since the load instructions perform memory reads. Rendering a code area "readable" may result in security-related issues.

Another conventional approach is to place each value directly after the instruction requiring it, and to read the value automatically. While this "inline approach" is convenient for single-issue processors, it requires complex hardware in processors for issuing multiple instructions at a time, since this approach requires detecting that some of the 'instructions' are actually data, then arranging for the data to be associated with the appropriate instruction.

Figure 1:
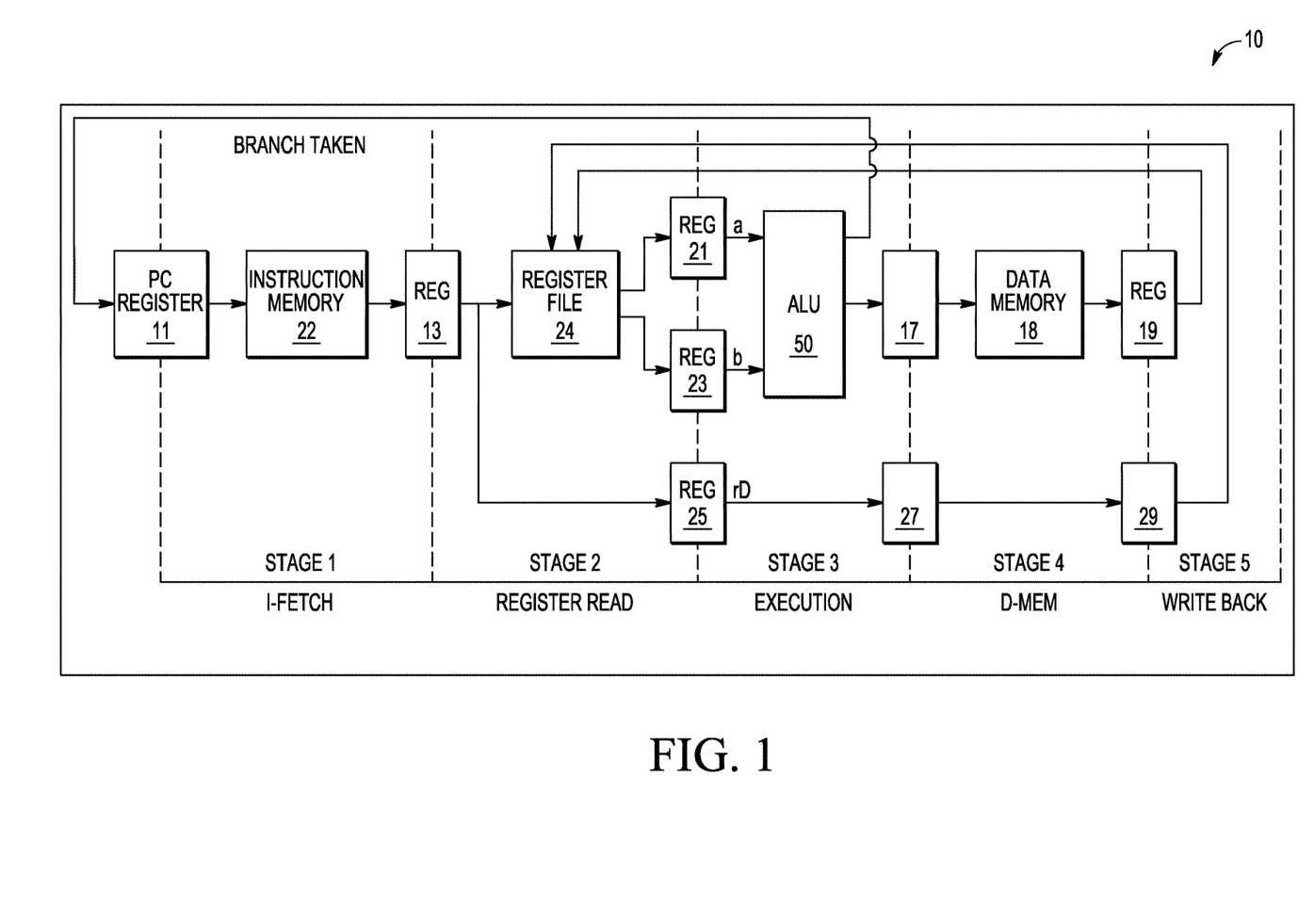
FIG. 1 is a schematic view of a conventional reduced instruction set computer (RISC) processor.

FIG. 1 is a schematic view of a conventional reduced instruction set computer (RISC) processor 10.

In a RISC processor pipeline, instructions are held in an instruction memory 22, for example, an ordinary memory or a cache. A program counter (pc) register 11 holds the address of the next instruction to be fetched from the instruction memory 22. At every clock, the pc, or instruction pointer (iptr), accesses the instruction memory 22 and increments. The instruction read from the instruction memory 22 is captured in a pipeline register 13 at Stage 2, or register read stage, of the pipeline. At the clock edge, the instruction is decoded by a decode function that is part of or otherwise in communication with the register file to recognize which registers are required, and then reads the source registers from a register file 24. The values read from the register file 24 are placed in pipeline registers 21, 23, respectively, for Stage 3, or execution stage. The identity of the destination register is output from register 13 to pipeline register 25. At the clock edge, an execution unit, or ALU 50, at Stage 3 reads the input values and the desired operation from outputs a, b the pipeline registers 21, 23, respectively, and executes the instruction according to the decoded version of the instruction using the selected data value. The ALU 50 outputs the result in the pipeline register 17 to Stage 4, or data memory (D-Mem) stage The destination register identity is copied from pipeline register 25 to pipeline register 27. At the clock edge, a data memory 18 reads its input pipeline register 17, and performs any required operation on the data memory 18. The destination register identity is copied from pipeline register 27 to pipeline register 29. When the operation required by the instruction is a memory operation, Stage 4 will perform that operation. If the operation required did not involve any memory operations, such as an add or other arithmetic or logical operation, Stage 4 passes through the result from the ALU 50 to a pipeline register 19 for Stage 5, or writeback stage. At the clock edge, the pipeline register 19 writes the value (if any) into the register in the register file 24 specified by the output from register 29.

Modern processors are generally more complicated than that illustrated at FIG. 1. In particular, the instruction memory 22 is generally organized so that an instruction memory access is larger than an instruction, so that multiple instructions are provided at each access. To handle this efficiently, an instruction buffer or queue (IQ) 36 is generally provided between Stage 1 and Stage 2, for example, shown in the schematic view 20 of FIG. 2. The instruction buffer 36 knows when it is nearly empty, and will request the pc register 11 to request a new batch of instructions. The pc increments by the number of instructions fetched at each access. It therefore holds a value which can be different from the value in the PC register 11, which always holds the address of the instruction being executed, not the address of the next block of instructions to be fetched from the instruction memory.

Figure 2:
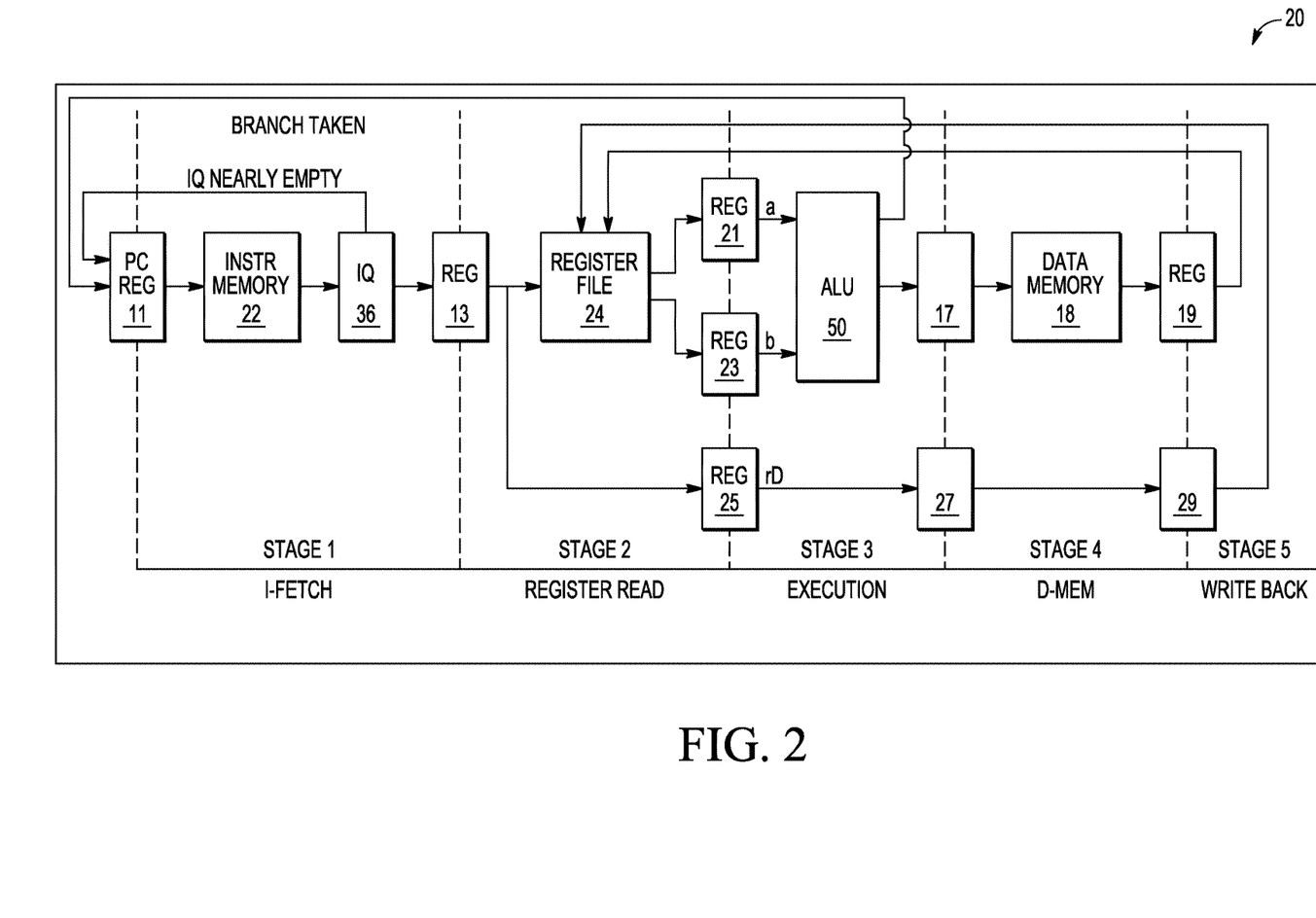
FIG. 2 is a schematic view of a conventional reduced instruction set computer (RISC) processor with an instruction buffer.

With regard to the foregoing conventional approaches, a program for such a processor includes a collection of instructions held in instruction memory 22. As is well known, the instructions specify actions to be performed in sequence by the processor and indicate the data to be used. They also specify transfers of control; that is, that execution now needs to proceed from an instruction other than the next instruction. Thus, a program is represented by sequences of operational instructions. It is therefore possible to identify the basic blocks in any program. A basic block is defined as a contiguous sequence of instructions which contains at most one transfer of control instruction (which if it exists is the last instruction in the block). A basic block is entered only at the first instruction of the block.

In brief overview, embodiments of systems and methods improve on the abovementioned conventional approaches with respect to addressing the need for computer programs to make use of constants which are larger than the size of an instruction.

Figure 3:
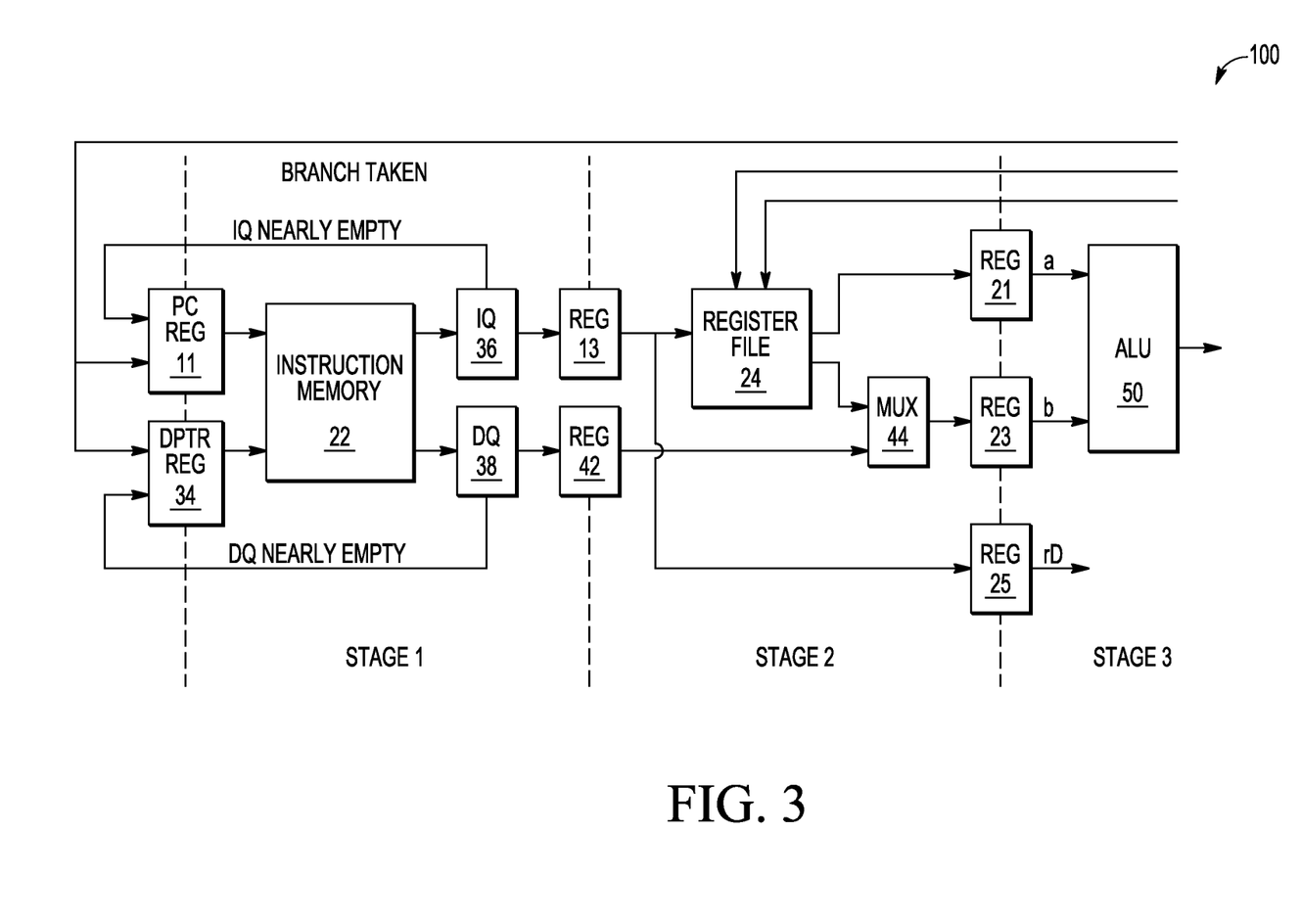
FIG. 3 is a schematic view of a processor architecture, in accordance with some embodiments.

FIG. 3 is a schematic view of one such embodiment of a processor 100. A description of those elements common to the processors of FIGS. 1 and 2 is not repeated for brevity. The processor 100 is not limited to those elements described in FIG. 3, and can include elements, features, and functions other than those illustrated in FIG. 3.

The processor 100 implements an improved computer architecture. The processor 100 may be part of an electronic device, such as a computing system comprising one or more processing units, for example, a microprocessor, digital control unit such as a DSP (Digital Signal Processor), a single-issue processor, a superscalar processor, or other form of stored-program computer. The improved computer architecture implemented by processor 100 adds a small number of instructions and a register to a normal stored-program processor architecture. Examples of such normal computer architectures include but are not limited to the POWER Architecture®, the MIPS® architecture, the ARM® architecture, the SPARC® architecture, the StarCore® architecture, and the like. Architectures for the purpose of teaching such as the DLX architecture can equally apply.

A data pointer (dptr) register 34 is positioned along with the pc register 11 at inputs of the instruction memory 22 at Stage 1 of the pipeline. A data buffer or queue (DQ) 38 is positioned along with the instruction buffer (IQ) 36 at outputs of the instruction memory 22. A multiplexer 44 is positioned in front of the pipeline register 23, or operand 'b' latch, which holds and outputs to the ALU 50 a constant value held in a register read pipeline register 42 between data buffer 38 and multiplexer 44 at the execution stage, or Stage 3. In some embodiments, the processor architecture 100 also adds instruction variants which can indicate that one of their source operands is a data value to be fetched from the data buffer 38.

Figure 4:
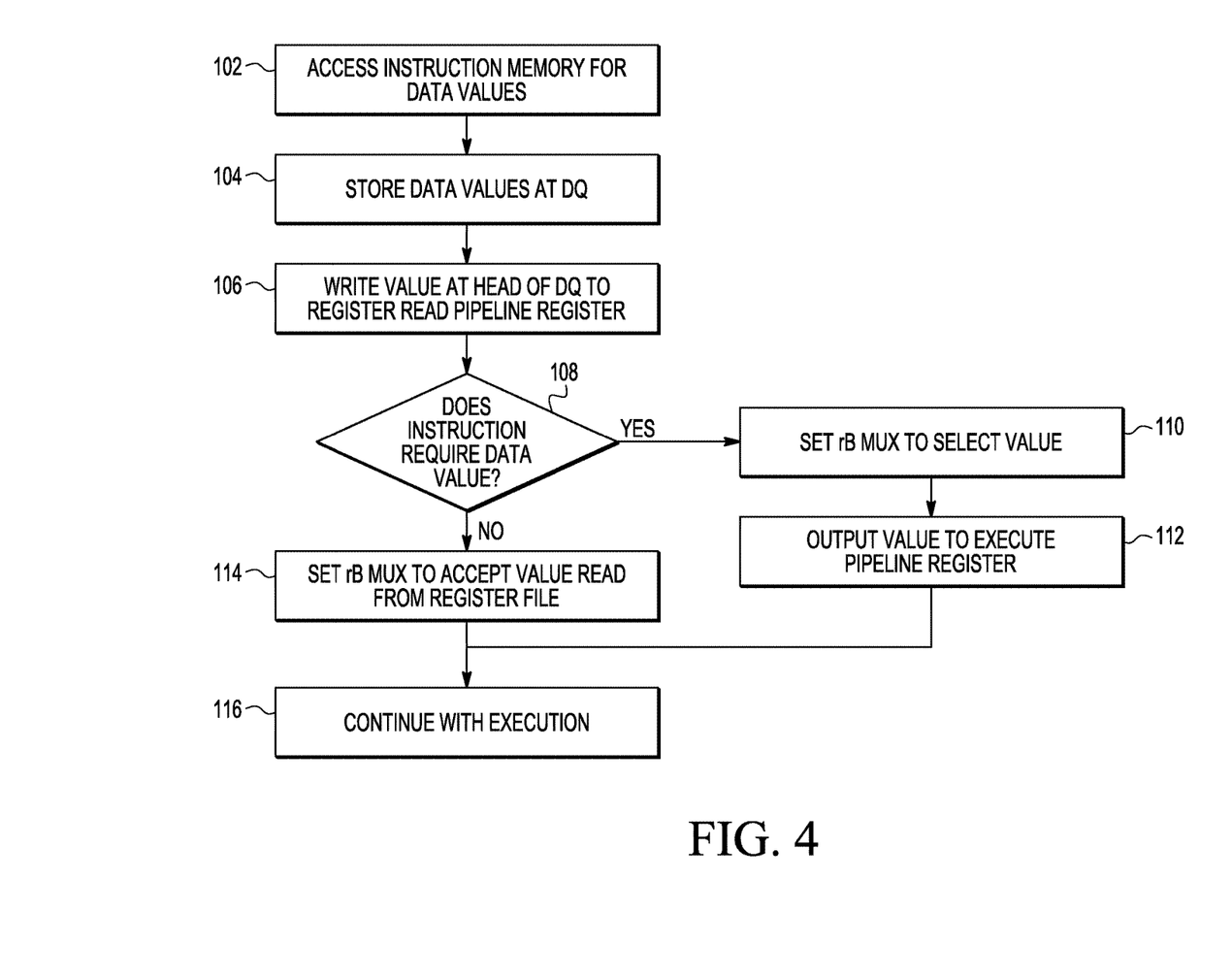
FIG. 4 is a flowchart illustrating an operation of a processor, in accordance with some embodiments.

FIG. 4 is a flowchart illustrating an operation of a processor, in accordance with some embodiments. Some or all of the method steps of the flowchart can be generated according to architectural specifications above. Accordingly, when describing the operation, reference is made to elements of FIG. 1-3.

In operation, at block 102, the data pointer at the dptr register 34 accesses the instruction memory 22 to provide data values rather than instructions. In particular, the dptr register 34 stores the addresses of data values to be fetched. At block 104, the data values are stored in the data buffer 38 according to values at the dptr register 34. At block 106, constant value data is read from the data buffer 38 when an instruction indicates that it requires the data. As the data buffer 38 is emptied, it will be refilled when necessary, using a DQ nearly empty signal output from the data buffer 38 to the dptr register 34 to indicate to the dptr register 34 that it must decrement. Once a determination is made that there is data in the data buffer 38, the value at the head of the data buffer 38 is written to the register read pipeline register 42.

At decision diamond 108, a determination is made at the register read stage whether the instruction requires a data value. When the register read stage determines that the instruction it is decoding requires a data value, for example, by a bit set in the instruction, the method proceeds to block 110 where the register read stage captures the data value from the pipeline register and sets the rB multiplexer 44 to select the constant value. The multiplexer 44 can include or otherwise communicate with a data value selector that selects the data value from either the instruction, the register file 24, or the data buffer 38 in response to the decoded version of the instruction. At block 112, the rB multiplexer 44 outputs the value to the pipeline register 23 of the execution stage, and at block 116, the execution may proceed as described in FIG. 1. Otherwise, if at decision diamond 108 a determination is made that the instruction does not need a data value, then at block 114 the multiplexer 44 is set to accept a value read from the register file 24. At block 116, subsequent pipeline stage actions are taken, such as the execution may proceed as described in FIG. 1.

Returning to FIG. 3, the data values are held in the instruction memory 22 immediately preceding any basic block requiring such data values. Here, the block must be branched to from another basic block. The branch instruction sets the value at the pc register 11 as usual, and also sets the dptr 34 to the same value. Accordingly, the pc register 32 and the dptr register 34 are constructed and arranged to be automatically set to be equal on a branch. The dptr 34 decrements to access each data value in turn in response to the execution of an instruction requiring a queued data value.

Accordingly, the processor 100 is constructed to provision an instruction to set the dptr 34 to the same value as the pc 11 to avoid having to branch to a basic block. Also, the provision of variants to the branch instruction so that when a basic block has no need for the data values, the dptr 34 is not set, thereby saving energy. Another improvement may include the ability to encode in a data-value the size of the data value. Another improvement may provide for an instruction variant which specifies the size of the data value. Another improvement may include variants to instructions which use data values to specify that the current data value should not be discarded, but used for the next instruction.

The description of the basic mechanism given here is sufficient for one skilled in the art to implement the foregoing scheme or an obvious variant in any processor of choice. Similarly, the descriptions of the improvements is sufficient for one skilled in the art to implement them.

The foregoing removes the limitations and issues with the prior art. In particular, a processor implemented in accordance with the computer architecture implemented by processor 100 is space efficient, in that just one bit may be sufficient in an instruction to specify the need for a data value, as processed by the data value selector of the multiplexer 44. It is also execution efficient, in that no extra instructions need to be executed to provide the data values to the instructions. In addition, it will generally suffer lower access latency than the 'data' method of the prior art, because (in a cached system) it is likely that instruction fetching will preload the data values.

In some embodiments, a processor implemented in accordance with the architecture 100 will perform the following sequence of operations for each instruction:
loop:
    read the next instruction from the memory at address specified by iptr
    decode the instruction to identify what function is to be performed
    perform the function:
        read the appropriate operands and perform the function
        write the result to the specified operand
    if the instruction is not a transfer of control instruction,
        increment iptr by the size of the instruction
repeat from loop:

The step of performing a function is different in detail for each instruction. For example, the operation 'add' might be specified as:
    extract the specifications for the source register operands into rA and rB
    extract the specification of the destination register int rD
    read the values of GPR[rA] and GPR[rB] and add the two values together
    write the result of the addition into register GPR[rD]

Because this style of definition is well-known, in practice an architectural specification generally does not specify each of these steps. Rather, it assumes the fetch/decode/execute/increment loop, or explains it in a preamble, and then concentrates on the actions performed by each instruction. An architecture specification language may be used to specify the operations precisely and formally and allow the automated construction of executable models, architecture manuals, assemblers and disassemblers and the like.

To explain the improved computer architecture in accordance with embodiments, an architecture specification language is used. To show how such a language is used, examples of some simple instructions present in normal architectures and that show the language usage are provided.

For the add instruction, the specification might be of the following form:

```
define (regfile=GPR) {
    size = 16;
    width = 32;
}
define (instrfield = fmt) {
    bits = (0, 3);
}
define (instrfield = op8) {
    bits = (16,23);
}
define (instrfield = Rd) {
    bits = (4, 7);
    ref = GPR;
    type = regfile;
}
define (instrfield = Ra) {
    bits = (8, 11);
    ref = GPR;
    type = regfile;
}
```

```
define (instrfield = Rb) {
    bits = (12, 15);
    ref = GPR;
    type = regfile;
}
define (instr = add) {
    fields = (fmt(7), op8(0), Rd, Ra, Rb);
    action = {
        GPR(Rd) = GPR(Ra) + GPR(Rb);
    };
}
```

Here, an 'add' instruction is defined, which is encoded in 24 bits. In this definition, the register file 24, or general purpose register (GPR) file, is defined as being 32 bits wide, and as containing 16 registers. In this add instruction, a format (fmt) field is specified as occupying bits 0 to 3 of an instruction. Instruction fields Ra, Rb and Rd, which specify source and destination operand registers, respectively, have their locations in the instruction specified, and also that they 'select from' the GPR register file.

In the definition of the add instruction, the fields of the instruction are listed. The add instruction uses the fields just specified. For example, the notation fmt(7) means that the fmt field has the value 7. Similarly, the op8 field in the instruction has the value 0. In addition, the instruction specifies that there are three fields Rd, Ra and Rb.

The action specifies the effect of executing the instruction. For add, it specifies that the operation reads the values from GPR(Ra) and GPR(Rb), adds the values together, and writes the result to GPR(Rd).

An add immediate instruction is one in which the second operand is specified by a value in the instruction itself. For example:

```
define (instrfield = op4) {
    bits = (8,11);
}
    define (instrfield = SL12) {
    bits = (12, 23);
    is_signed = true;
}
define (instr = addi) {
    fields = (fmt(6), Rd, op4(1), SL12);
    action = {
        GPR(Rd) = GPR(Rd) + SL12;
    };
}
```

This instruction adds a 12 bit signed value to a register.

In some embodiments, a branch instruction is considered. A branch instruction which always transfers control to an address at a distance of up to 16 bits away from the instruction requires a 16 bit displacement in the instruction. This field might be specified for a 24 bit branch instruction as follows:

```
define (instrfield = BD16) {
    bits = ((4,7), (12, 23));
    addr = iptr;
    is_signed = true;
}
define (instr = b24) {
    fields = (fmt(11), op4(0), BD16);
    action = {
        NIA = BD16;
    };
}
```

The unconditional branch instruction has the fields fmt, which has the value 11, op4, which has the value 0, and the BD16 field, which is composed of two fields, one from bit 4 to bit 7, and the other from bit 12 to bit 24. The displacement specified by BD16 is a displacement from iptr, the address of the current instruction, and is signed.

The branch instruction simply sets the next instruction address (NIA) to the desired value, by adding the 16 bit displacement to the address of the current instruction.

Some embodiments may be specified in this manner in a like manner to the following:

First, a branch instruction making use of a processor in accordance with some embodiments, with the dptr register and the fields of the instruction being specified:

```
define (reg = dptr) {              // define dptr, the new register used in
                                   the invention
};
define (instrfield = op3) {
    bits = (4, 6);
define (instrfield = dataval) {    // define the dataval field, which is a
                                   single bit, and
    bits = (7);                    // which if set to 1 in the instruction
                                   will result in
                                   // consumption of the next data value
                                   indicated by dptr }
define (instruc = b16dv) {         // define a branch instruction which in
                                   addition to its
                                   // usual transfer of control action also
                                   sets up the
                                   // dptr register
    fields = (fmt(12), op3(0));
    action ={
        NIA = cia + Mem(dptr);
        dptr = NIA;
    };
}
```

The action of the instruction is to read a value from memory at the address specified by the value of the dptr register, and to add it to the current instruction address to form the NIA; and then to set dptr to the same value as NIA.

And now the add immediate instruction which makes use of an embodiment of the invention could be defined as follows:

```
define (instr = addidv) {
    fields = (fmt(6), Rd, Ra, Rb, dataval, op3(1));
    action = {
        if (dataval == 1) {
            GPR(Rd) = GPR(Ra) + Mem(dptr);    // use the dataval
            dptr = dptr - 1;                   // decrement dptr
        }
        else {
            GPR(Rd) = GPR(Ra) + GPR(Rb);       // as before
        }
    };
}
```

Note that in neither instruction is the dptr specified by a field in the instruction.

The improvements noted above may be specified in an manner known to one of ordinary skill in the art. As an example, the instruction for setting dptr to the current instruction address could be specified as follows:

```
define (instruc = setdptr) {
    fields = (fmt(6), op3(2));
    action = {
        dptr = cia;
    }
```

And the branch which does not set dptr:

```
define (instruc = b16dvu) {
    fields = (fmt(12), op3(1));
    action = {
        NIA = cia + Mem(dptr);
    }
```

An explanation of functions of the processor 100 illustrated in FIG. 3 is as follows.

An input latch 13 and register read pipeline register 42 can be between the instruction buffer 36 and data buffer 38, respectively, and the register file 24 of the register read stage (Stage 2). The input latch 13 can receive and hold an instruction output from the instruction buffer 36 for the register read stage. The instruction buffer 36 receives an instruction from the instruction memory 22 according to a value at the PC register 11. For example, at the beginning of a clock cycle, the input latch 13 holds an instruction fetched from the instruction memory 22, which is output to the register file 24 during the clock cycle. The register read pipeline register 42 can receive and hold a constant value from the data buffer 38 for providing with an instruction requiring the constant value.

The following example is provided of subroutine code in assembly language for a processor according to some embodiments herein:

```
0.9999932946; //c1
-0.4999124376; // c2
0.0414877472; // c3
-0.0012712095; // c4
cosine:
// the function takes its first argument in register r1
// and returns the result in register r3.
r2 = r1 * r1; // x squared
r3 = r2 * const;
r3 = r3 + const;
r3 = r3 * r2;
r3 = r3 + const;
r3 = r3 * r2;
r3 = r3 + const;
return;
```

The foregoing code is constructed to compute an approximation to the value of the cosine of an angle. The subroutine may be invoked by placing the value of the angle for which the cosine must be computed into register r1, and then performing a branch and link instruction or equivalent to the address of the subroutine, which is the address of the label cosine. The branch and link instruction sets each of the program counter 32 and the dptr register 34 to the address of the cosine subroutine. As the cosine subroutine is executed, the processor 10 processes each instruction in the subroutine in turn. When the processor 10 receives the instruction r3=r2*const, it decrements the value in the dptr register 34, reads from memory, and provides the value to the ALU 50 to perform the multiply operation. That is, the notation const indicates that the instruction contains the dataval field and that the field is set to 1, meaning that a constant value is required. As the processor 10 executes the subroutine, it uses successively the values c4, c3, c2, and c1 in the instructions requiring the const.

In some embodiments, memory utilization can be improved by providing more than one length of a constant, for example, 32 bit and 64 bit constants. Constants can be distinguished from each other, for example, according to length, by adding a "constant length" field to an instruction Accordingly, one or more methods described herein can apply to variable length data.

As described, the data pointer at dptr register 34 can automatically decrement when an instruction is processed in the pipeline processor 10 which requires a constant value from the DQ. Alternatively, the data pointer at the dptr register 34 can be controlled by separate fields in the instruction. In doing so, several instructions can reuse the same constant.

As will be appreciated, embodiments as disclosed include at least the following. In one embodiment, a digital processor comprises an instruction memory having a first input, a second input, a first output, and a second output. A program counter register is in communication with the first input of the instruction memory. The program counter register is configured to store an address of an instruction to be fetched. A data pointer register is in communication with the second input of the instruction memory. The data pointer register is configured to store an address of a data value in the instruction memory. An instruction buffer is in communication with the first output of the instruction memory. The instruction buffer is arranged to receive an instruction according to a value at the program counter register. A data buffer is in communication with the second output of the instruction memory. The data buffer is arranged to receive a data value according to a value at the data pointer register.

Alternative embodiments of the digital processor can include one of the following features, or any combination thereof. The digital processor of claim 1, further comprises a register file, an instruction decode function that receives the instruction from the instruction buffer, decodes the instruction, and outputs a decoded version of the instruction, and a data value selector that selects a data value from either the instruction, the register file, or the data buffer in response to the decoded version of the instruction. The digital processor further comprises an execution unit that executes the instruction according to the decoded version of the instruction using the selected data value. The digital processor of claim 1 further comprises a branch taken line that updates both the program counter register and the data pointer register by writing a branch destination address to both the program counter register and the data pointer register when the digital processor executes a taken branch instruction. The data pointer register and the program counter register are automatically configured to be equal when the taken branch instruction is executed. The data pointer register decrements to access each data value of a plurality of data values in turn in response to the execution of an instruction using a value from the data buffer.

In another embodiment, a pipeline processor comprises a first stage. The first stage comprises an instruction memory, a program counter register configured to store an address of an instruction to be fetched, a data pointer register configured to store an address of a data value to be fetched from the instruction memory, an instruction buffer arranged to receive an instruction according to a value at the program counter register; and a data buffer arranged to receive a data value according to a value at the data pointer register.

Alternative embodiments of the pipeline processor include one of the following features, or any combination thereof. The pipeline processor further comprises a second stage, comprising a register file, an instruction decode function that receives the instruction from the instruction buffer, decodes the instruction, and outputs a decoded version of the instruction, and a data value selector that selects a data value from either the instruction, the register file, or the data buffer in response to the decoded version of the instruction. The pipeline processor further comprises a third stage, comprising an execution unit that executes the instruction according to the decoded version of the instruction using the selected data value. The instruction includes a bit that establishes whether the selected data value is output to the execution unit. The pipeline processor further comprises a first operand latch between the register file and the execution unit for temporarily storing the operand data from the register file and a second operand latch between the pipeline register for temporarily storing the selected data value. The pipeline processor further comprises a branch taken line that updates both the program counter register and the data pointer register by writing a branch destination address to both the program counter register and the data pointer register when the digital processor executes a taken branch instruction. The data pointer register and the program counter register are automatically configured to be equal when the taken branch instruction is executed. The data pointer register decrements to access each data value of a plurality of data values in turn in response to the execution of an instruction using a value from the data buffer.

In another embodiment, a method is provided of processing an inline constant. The method comprises storing, at a program counter register in communication with an instruction memory, an address of an instruction to be fetched; storing, at a data pointer register in communication with the instruction memory, an address of a data value in the instruction memory; receiving, at an instruction buffer in communication with the instruction memory, an instruction according to a value at the program counter register; and receiving, at a data buffer in communication with the instruction memory, a data value according to a value at the data pointer register.

Alternative embodiments of the pipeline processor include one of the following features, or any combination thereof. The method further comprises decoding, at an instruction decode function, the instruction from the instruction buffer; outputting a decoded version of the instruction to a data value selector; and selecting, at the data value selector, a data value from either the instruction, the register file, or the data buffer in response to the decoded version of the instruction. The method further comprises executing, at an execution unit, the instruction according to the decoded version of the instruction using the selected data value. The method further comprises updating, at a branch taken line, both the program counter register and the data pointer register by writing a branch destination address to both the program counter register and the data pointer register when the digital processor executes a taken branch instruction. The method further comprises automatically configuring the data pointer register and the program counter register to be equal when the taken branch instruction is executed. The method further comprises decrementing the data pointer register to access each data value of a plurality of data values in turn in response to the execution of an instruction using a value from the data buffer.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A digital processor, comprising:
an instruction memory having a first input, a second input, a first output, and a second output;
a program counter register in communication with the first input of the instruction memory, the program counter register configured to store an address of an instruction to be fetched, and the program counter register increments to access an address of a next instruction to be fetched;
a data pointer register in communication with the second input of the instruction memory, the data pointer register configured to store an address of a data value to be fetched and accesses the instruction memory to present the address to the instruction memory so that the data value can be retrieved and written into a data buffer, and so that a constant value of the data value can be retrieved from the data buffer that is too large for a given instruction;
an instruction buffer in communication with the first output of the instruction memory, the instruction buffer arranged to receive an instruction according to a value at the program counter register, the program counter register having a first input for receiving a request from the instruction buffer for new instructions and a second input coupled to a branch taken line that writes a branch destination address to the program counter register when the digital processor executes a taken branch instruction;
the data buffer in communication with the second output of the instruction memory, the data buffer arranged to receive and store a data value from the instruction memory according to a value at the data pointer register, wherein the data value includes a constant value, wherein the constant value is larger than the instruction, and wherein the constant value is read from the data buffer when an instruction in the digital processor requires the constant value, the data pointer register having a first input for receiving a request from the data buffer that the data pointer register to perform a decrement operation and a second input coupled to the branch taken line that also writes the branch destination to the data pointer register when the digital processor executes a taken branch instruction.

2. The digital processor of claim 1, further comprising:
a register file;
an instruction decode function that receives the instruction from the instruction buffer, decodes the instruction, and outputs a decoded version of the instruction; and
a data value selector that selects either the data value received from the data buffer or a value received from the register file.

3. The digital processor of claim 2, further comprising:
an execution unit that executes the instruction according to the decoded version of the instruction using the selected data value.

4. The digital processor of claim 1, further comprising:
the branch taken line that updates both the program counter register and the data pointer register by writing a branch destination address to both the program counter register and the data pointer register when the digital processor executes the taken branch instruction.

5. The digital processor of claim 4, wherein the data pointer register and the program counter register are automatically configured to be set to a same value when the taken branch instruction is executed.

6. The digital processor of claim 1, wherein the data pointer register decrements when the instruction is processed which requires the constant value from the data buffer.

7. A pipeline processor, comprising:
a first stage, comprising:
an instruction memory;
a program counter register configured to store an address of an instruction to be fetched, and the program counter register increments to access an address of a next instruction to be fetched;
a data pointer register configured to store an address of a data value to be fetched and accesses the instruction memory to present the address to the instruction memory so that the data value can be retrieved and written into a data buffer, and so that a constant value of the data value can be retrieved from the data buffer that is too large for a given instruction;
an instruction buffer arranged to receive an instruction according to a value at the program counter register, the program counter register having a first input for receiving a request from the instruction buffer for new instructions and a second input coupled to a branch taken line that writes a branch destination address to the program counter register when the digital processor executes a taken branch instruction; and
the data buffer arranged to receive and store a data value according from the instruction memory to a value at the data pointer register, wherein the data value includes a constant value, wherein the constant value is larger than the instruction, and wherein the constant value is read from the data buffer when an instruction in the pipeline processor requires the constant value, the data pointer register having a first input for receiving a request from the data buffer that the data pointer register to perform a decrement operation and a second input coupled to the branch taken line that also writes the branch destination to the data pointer register when the digital processor executes a taken branch instruction.

8. The pipeline processor of claim 7, further comprising:
a second stage, comprising:
a register file;
an instruction decode function that receives the instruction from the instruction buffer, decodes the instruction, and outputs a decoded version of the instruction; and
a data value selector that selects either the data value received from the data buffer or a value received from the register file.

9. The pipeline processor of claim 8, further comprising:
a third stage, comprising:
an execution unit that executes the instruction according to the decoded version of the instruction using the selected data value.

10. The pipeline processor of claim 9, wherein the instruction includes a bit that establishes whether the selected data value is output to the execution unit.

11. The pipeline processor of claim 9, further comprising a first operand latch between the register file and the execution unit for temporarily storing the operand data from the register file and a second operand latch between the pipeline register for temporarily storing the selected data value.

12. The pipeline processor of claim 7, further comprising:
the branch taken line that updates both the program counter register and the data pointer register by writing a branch destination address to both the program counter register and the data pointer register when the digital processor executes the taken branch instruction.

13. The pipeline processor of claim 7, wherein the data pointer register and the program counter register are automatically configured to be set to a same value when the taken branch instruction is executed.

14. The pipeline processor of claim 7, wherein the data pointer register decrements when the instruction is processed which requires the constant value from the data buffer.

15. A method of processing an inline constant, comprising:
storing, at a program counter register in communication with an instruction memory, an address of an instruction to be fetched, wherein the program counter register increments to access an address of a next instruction to be fetched;
storing, at a data pointer register in communication with the instruction memory, an address of a data value to be fetched and accesses the instruction memory to present the address to the instruction memory so that the data value can be retrieved and written into a data buffer, and so that a constant value of the data value can be retrieved from the data buffer that is too large for a given instruction;
receiving, at an instruction buffer in communication with the instruction memory, an instruction according to a value at the program counter register, the program counter register having a first input for receiving a request from the instruction buffer for new instructions and a second input coupled to a branch taken line that writes a branch destination address to the program counter register when the digital processor executes a taken branch instruction; and
receiving, at the data buffer in communication with the instruction memory, a data value from the instruction memory according to a value at the data pointer register, wherein the data value includes a constant value, wherein the constant value is larger than the instruction, and wherein the constant value is read from the data buffer when an instruction in the digital processor requires the constant value, the data pointer register having a first input for receiving a request from the data buffer that the data pointer register to perform a decrement operation and a second input coupled to the branch taken line that also writes the branch destination to the data pointer register when the digital processor executes a taken branch instruction.

16. The method of claim 15, further comprising:
decoding, at an instruction decode function, the instruction from the instruction buffer; outputting a decoded version of the instruction to a data value selector; and
selecting, at the data value selector, either the data value received from the data buffer or a value received from the register file.

17. The method of claim 16, further comprising:
executing, at an execution unit, the instruction according to the decoded version of the instruction using the selected data value.

18. The method of claim 15, further comprising:
updating, at the branch taken line, both the program counter register and the data pointer register by writing a branch destination address to both the program counter register and the data pointer register when the digital processor executes the taken branch instruction.

19. The method of claim 18, further comprising automatically configuring the data pointer register and the program counter register to be set to a same value when the taken branch instruction is executed.

20. The method of claim 15, further comprising decrementing the data pointer register when the instruction is processed which requires the constant value from the data buffer.

* * * * *